United States Patent
Brown et al.

(10) Patent No.: US 11,781,533 B2
(45) Date of Patent: Oct. 10, 2023

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Konstantinos Pantelidis, Cambridge (GB); Robin Eddington, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 0 days.

(21) Appl. No.: 17/781,313

(22) PCT Filed: Dec. 2, 2020

(86) PCT No.: PCT/IB2020/000964
§ 371 (c)(1),
(2) Date: May 31, 2022

(87) PCT Pub. No.: WO2021/111181
PCT Pub. Date: Jun. 10, 2021

(65) Prior Publication Data
US 2022/0412327 A1  Dec. 29, 2022

(30) Foreign Application Priority Data
Dec. 1, 2019 (GB) ..................... 1917538

(51) Int. Cl.
*F03G 7/06* (2006.01)
(52) U.S. Cl.
CPC ............... *F03G 7/06143* (2021.08)
(58) Field of Classification Search
CPC .... F03G 7/06; H04N 23/6815; H04N 23/687; H04N 23/6812; H04N 23/57;
(Continued)

(56) References Cited

U.S. PATENT DOCUMENTS 6,326,707 B1   12/2001   Gummin et al.
8,629,935 B2 *  1/2014   Kikuchi ............... H04N 23/651
                                                             348/241
(Continued)

FOREIGN PATENT DOCUMENTS

WO   WO2012038703 A2   3/2012
WO   WO2018112436 A1   6/2018

OTHER PUBLICATIONS

British Search Report, dated Nov. 26, 2020, issued in British Pat. App. No. 1917538.9 (4 pages).
(Continued)

*Primary Examiner* — Shafiq Mian
(74) *Attorney, Agent, or Firm* — Haley Guiliano LLP

(57) ABSTRACT

A shape memory alloy actuator assembly (2) is disclosed. The actuator assembly comprises a support (21), a first stage (22) moveable in at least two different non-parallel directions in a first plane relative to the support, a first set of at least two shape memory alloy wires ($27_1$) configured to move the first stage in the first plane, a second stage (23) moveable in at least two different non-parallel in a second plane parallel to or coplanar with the first plane relative to the first stage, and a second set of at least two shape memory alloy wires ($27_2$) configured to move the second stage in the second plane. The first stage is coupled to the support via the first set of shape memory alloy wires and the second stage is coupled to the first stage via the second set of shape memory alloy wires such that movement of the second stage in the second plane with respect to the support is a combination of movement of the first stage relative to support and the second stage relative to the first stage.

20 Claims, 11 Drawing Sheets

(58) Field of Classification Search
CPC .... G03B 2205/0076; G03B 2205/0023; G03B 3/02; G02B 27/646
See application file for complete search history.

(56) References Cited

U.S. PATENT DOCUMENTS

| | | | | |
|---|---|---|---|---|
| 8,866,918 | B2* | 10/2014 | Gregory | H04N 23/6815 |
| | | | | 348/208.99 |
| 2010/0074608 | A1* | 3/2010 | Topliss | G03B 3/10 |
| | | | | 60/528 |
| 2010/0283887 | A1* | 11/2010 | Topliss | H04N 23/57 |
| | | | | 60/527 |
| 2011/0179786 | A1* | 7/2011 | Topliss | G03B 3/10 |
| | | | | 60/527 |
| 2019/0271855 | A1* | 9/2019 | Hu | G02B 7/09 |

OTHER PUBLICATIONS

International Search Report and Written Opinion, dated Mar. 29, 2021, issued in Int'l. App. No. PCT/IB2020/000964 (8 pages).

\* cited by examiner

ACTUATOR ASSEMBLY

CROSS-REFERENCE TO RELATED APPLICATIONS

This application is a national stage application under 35 U.S.C. § 371 of International Application PCT/IB2020/000964, filed Dec. 2, 2020, which claims priority of GB Patent Application 1917538.9, filed Dec. 1, 2019. The disclosure of which are hereby incorporated by reference herein in their entireties.

FIELD

The present application relates to an actuator assembly, particularly an actuator assembly comprising a plurality of lengths of shape-memory alloy (SMA) wire.

BACKGROUND

Such an actuator assembly may be used, for example, in a camera to move a lens assembly in directions perpendicular to the optical axis so as to provide optical image stabilization (OIS). Where such a camera is to be incorporated into a portable electronic device such as a mobile telephone, miniaturization can be important.

WO 2019/086855 A1 describes a camera with an actuator assembly including a support platform, a moving platform that supports a lens assembly, SMA wires connected to the support platform and the moving platform, bearings to bear the moving platform on the support platform, and two arms extending between the support platform and the moving platform.

SUMMARY

According to a first aspect of the present invention, there is provided a shape memory alloy actuator assembly. The actuator assembly comprises a support, a first stage moveable in at least two different non-parallel directions in a first plane relative to the support, a first set of at least two shape memory alloy wires configured to move the first stage in the first plane, a second stage moveable in at least two different non-parallel in a second plane parallel to or coplanar with the first plane relative to the first stage, and a second set of at least two shape memory alloy wires configured to move the second stage in the second plane. The first stage is coupled to the support via the first set of memory alloy wires and the second stage is coupled to the first stage via the second set of shape memory alloy wires such that movement of the second stage in the second plane with respect to the support is a combination (for example, sum) of movement of the first stage relative to support frame and the second stage relative to the first stage.

The first stage is preferably rigid. The first stage may tilt during operation, in other words, when the stage is moved by shape memory alloy wires.

The first set of at least two shape memory alloy wires preferably comprises four shape memory alloy wires comprising a first pair of wires acting in opposition for moving the first stage in a first direction, and a second pair of wires acting in opposition for moving the first stage in a second direction different from the first direction. The second set of at least two shape memory alloy wires preferably comprises four shape memory alloy wires comprising a third pair of wires acting in opposition for moving the second stage in the first direction or in a third direction, and a fourth pair of wires acting in opposition for moving the second stage in the second direction or in a fourth direction different from the third direction.

The memory alloy wires are preferably non collinear. The first set of shape memory alloy wires are preferably configured such that they are capable (when suitably driven) of moving the first stage without applying any net torque. The second set of shape memory alloy wires are preferably configured to such that they are capable of moving the second stage without applying any net torque.

The actuator assembly may further comprise first and second terminals. A first shape memory alloy wire in the first set of shape memory alloy wires and a second shape memory alloy wire in the second set of shape memory alloy wires may be electrically connected in series between the first and second terminals, wherein the first and second shape memory alloy wires act in concert to move the first and second stages, respectively. Alternatively, a first shape memory alloy wire in the first set of shape memory alloy wires and a second shape memory alloy wire in the second set of shape memory alloy wires are electrically connected in parallel between the first and second terminals, wherein the first and second shape memory alloy wires act in concert to move the first and second stages, respectively. The terminals may be comprised in or supported by the support.

The first and second shape memory alloy wires may be interconnected in the first stage. The first stage may comprise a conducting layer supported by an insulating layer, wherein at least a portion of the conducting layer interconnects the first and second shape memory alloy wires. The first and second shape memory alloy wires may be positioned on the same side of the actuator assembly, for example, one above the other.

The actuator assembly may further comprise a common node, wherein at least a first shape memory alloy wire in the first set of shape memory alloy wires and at least a second shape memory alloy wire in the second set of shape memory alloy wires are connected to the common node and wherein the common node is comprised in the first stage. The actuator assembly may comprise a flexible electrical connection between the support and the common node. The actuator assembly may comprise a flexible electrical connection between the support and the second stage to electrically connect to the at least one second shape memory alloy wire.

The actuator assembly may further comprise a common node, wherein at least one pair of shape memory alloy wires consisting of one of the first set of shape memory alloy wires and one of the second set of shape memory alloy wires is electrically connected in series to the common node and wherein the common node is comprised in the second stage. The actuator assembly may comprise a flexible electrical connection between the support and the common node.

The actuator assembly may further comprise five terminals including first through to fifth terminals, the fifth terminal being a common terminal, wherein the first and second sets of shape memory alloy wires are connected to the terminals such that, in response to respective signals being applied to the first through fourth terminals with respect to the common terminal, the first and second sets of sets of shape memory alloy wires cause the first and second stages to move in concert. The actuator assembly may include at least one additional stage and at least one additional set of shape memory alloy wires, and the first and second sets of shape memory alloy wires and the at least one additional set of shape memory alloy wires may be connected to the terminals such that, in response to respective signals being applied to the first through fourth terminals with respect to the common terminal, the first and second sets of shape memory alloy wires and the at least one additional set of shape memory alloy wires cause the first and second stages and the at least one additional stages to move in concert. The terminals may be comprised in or supported by the support.

The actuator assembly may further comprise a set of electrically-conductive tracks formed on the support, the first stage and/or the second stage. The electrically-conductive tracks may include patterned tracks. The actuator assembly may further comprise layers of dielectric material for electrically-insulating different electrically-conducting parts of the actuator assembly from each other.

The actuator assembly preferably further comprises a bearing system configured to enable the movement of the second stage in the at least two different non-parallel in the second plane. The second stage preferably directly bears on the support via the bearing system. The bearing system preferably comprises at least three bearings passing through the first stage, for example, through an aperture, corresponding apertures or through cut-outs extending from an edge of the first stage.

The actuator assembly preferably further comprises an arrangement for loading the bearing system by urging the support and second stage together with the first stage interposed between the support and second stage.

The loading arrangement may comprise a set of at least two biasing springs. At least one of the springs carries an electrical connection between the support and the second stage. The loading arrangement may comprise at least one permanent magnet.

The at least two biasing springs may comprise at least two spring arms. The at least two spring arms and the second stage or support may be formed in a single piece. The at least two spring arms may each have first and second ends, the first end secured to the second stage (for example, by virtue of being integrally formed with the second stage) and the second end secured to the support (for example, by being attached, for instance, by welding or another suitable attachment method). The first stage, and optional further stages, may be interposed between the support and second stages. The at least two spring arms may pass outside of the first stage and any optional further stages (i.e., generally on the outside of the actuator assembly).

The first set of shape memory alloy wires and/or the second set of shape memory alloy wires may be inclined with respect to the first plane so as encourage urging of the support and second stage together.

The actuator assembly may comprise a third stage moveable in at least two different non-parallel directions in a third plane parallel to or coplanar with the first plane relative to the second stage and a third set of at least two shape memory alloy wires configured to move the third stage, wherein in third stage is interposed between the first stage and the second stage. This can be used to extend range of movement even further.

The actuator assembly may further comprise an additional stage moveable perpendicularly to the first plane, wherein the additional stage is supported by the second stage. For example, the first and second stages can be used to provide movement in the x-y plane and the additional stage can be used for to provide movement along a z-axis (perpendicular to the x-y plane).

The support, first stage and the second stage may be stacked in a direction normal to the first plane.

At least two of the support, the first stage and the second stage may be generally co-planar and nested.

At least some areas of first and/or second opposite faces of the support, the first stage and/or second stage may be coated with a dielectric material, such as diamond-line carbon (DLC) coating or titanium carbide (TiC).

According to a second aspect of the present invention there is provided a system comprising the actuator assembly of the first aspect of the present invention, a supply rail for delivering a drive voltage, a set of switching devices for applying drive signals at the drive voltage to respective shape memory alloy wires or respective pairs of shape memory alloy wires and a controller for individually controlling the switching devices.

According to a third aspect of the present invention there is provided an optical device comprising a body, a first optical element (such as an image sensor) and a second optical element (such as a lens) and the actuator assembly of the first aspect of the invention or the system of the second aspect of the present invention, wherein the first optical element and second optical element are generally aligned along an optical axis, and wherein the first optical element and the support of the actuator element are fixed with respect to the body and the second optical element is supported by second stage of the optical element.

According to a fourth aspect of the present invention there is provided a method of using the actuator assembly of the first aspect of the present invention, the method comprising causing a drive signal to be applied to at least one shape memory alloy wire or at least one pair of shape memory alloy wires, each pair of shape memory alloy wires comprising a one shape memory alloy wire in the first set of shape memory alloy wires and a one shape memory alloy wire in the second set of shape memory alloy wires.

According to a fifth aspect of the present invention there is provided a method of manufacturing the actuator assembly of the first aspect of the present invention, the method comprising providing a strut element comprising a sacrificial strut body and crimp tabs held apart by the sacrificial strut body, deploying a shape memory alloy wire across the crimp tabs of the strut element, folding and pressing the crimp tabs over the shape memory alloy wire to form crimps holding the shape memory alloy wire therebetween, attaching the crimps to the support and first stage, respectively, or to the first stage and second stage, respectively and removing the sacrificial strut body, leaving the crimps attached to the support and the first stage, respectively, or to the first stage and the second stage, respectively.

BRIEF DESCRIPTION OF THE DRAWINGS

Certain embodiments of the present invention will now be described, by way of example only, with reference to the accompanying drawings, in which.

DETAILED DESCRIPTION

Camera

Figure 1:
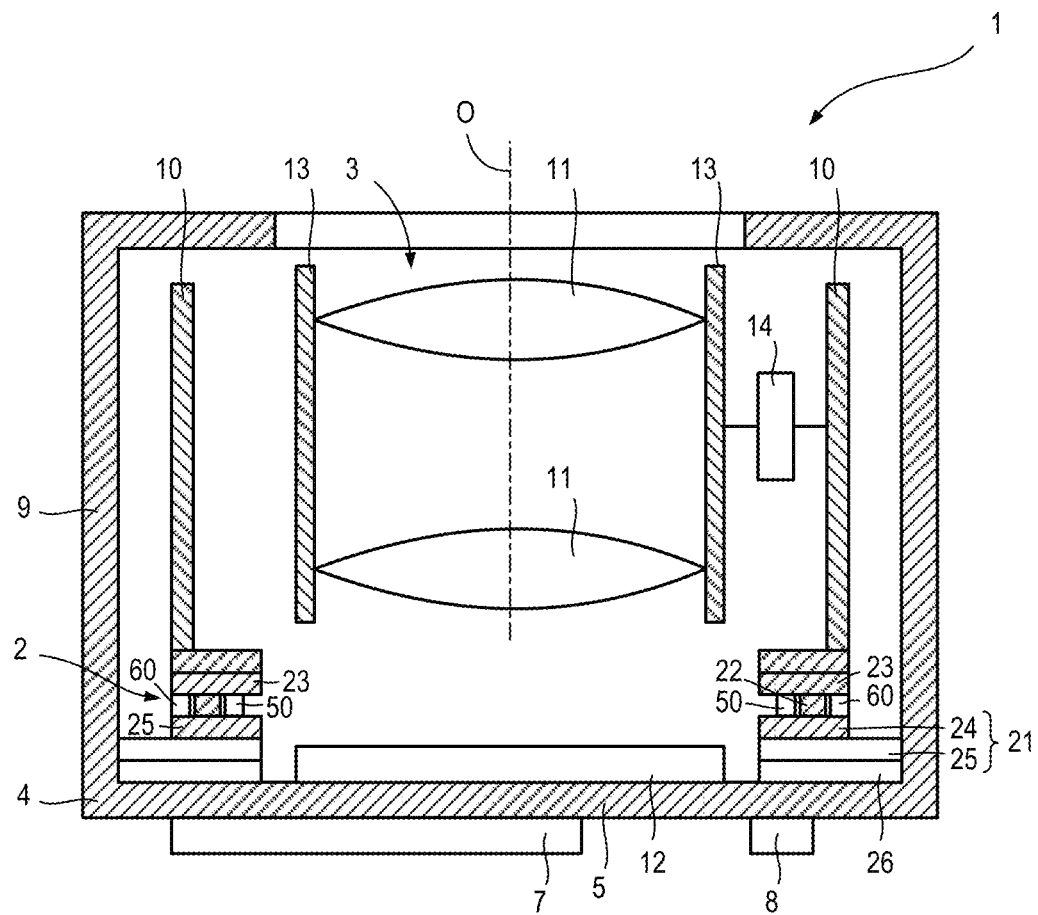
FIG. 1 is a schematic cross-sectional view of a camera incorporating an SMA actuator assembly.

Referring to FIG. 1, a camera 1 incorporating an SMA actuator assembly 2 (herein also referred to as an "SMA actuator" or simply an "actuator") is shown.

The camera 1 includes a lens assembly 3 suspended on a support structure 4 by an SMA actuator assembly 2 that supports the lens assembly 3 in a manner allowing movement of the lens assembly 3 relative to the support structure 4 in directions perpendicular to the optical axis O.

The support structure 4 includes a base 5. An image sensor 12 is mounted on a front side of the base 5. On a rear side of the base 5, there is mounted an integrated circuit (IC) 7 in which a control circuit is implemented, and also a gyroscope sensor 8. The support structure 4 also includes a can 9 which protrudes forwardly from the base 5 to encase and protect the other components of the camera 1.

The lens assembly 3 includes a lens carriage 10 in the form of a cylindrical body supporting two lenses 11 arranged along the optical axis O. In general, any number of one or more lenses 11 may be included. Preferably, each lens 11 has a diameter of up to about 20 mm. The camera 1 can therefore be referred to as a miniature camera.

The lens assembly 3 is arranged to focus an image onto the image sensor 12. The image sensor 12 captures the image and may be of any suitable type, for example, a charge-coupled device (CCD) or a complementary metal-oxide-semiconductor (CMOS) device.

The lenses 11 are supported on the lens carriage 10 such that the lenses 11 are movable along the optical axis O relative to the lens carriage 10, for example to provide focussing or zoom. In particular, the lenses 11 are fixed to a lens holder 13 which is movable along the optical axis O relative to the lens carriage 10. Although all the lenses 11 are fixed to the lens holder 13 in this example, in general, one or more of the lenses 11 may be fixed to the lens carriage 10 and so not movable along the optical axis O relative to the lens carriage 10, leaving at least one of the lenses 11 fixed to the lens holder 13.

An axial actuator arrangement 14 provided between the lens carriage 10 and the lens holder 13 is arranged to drive movement of the lens holder 10 and the lenses 11 along the optical axis O relative to the lens carriage 10. The axial actuator arrangement 14 may be of any suitable type, for example, a voice coil motor (VCM) or an arrangement of SMA wires.

In operation, the lens assembly 3 is moved orthogonally to the optical axis O, relative to the image sensor 12, with the effect that the image on the image sensor 12 is moved. This is used to provide optical image stabilization (OIS), compensating for movement of the camera 1, which may be caused by hand shake etc.

Actuator Assembly

Figure 2:
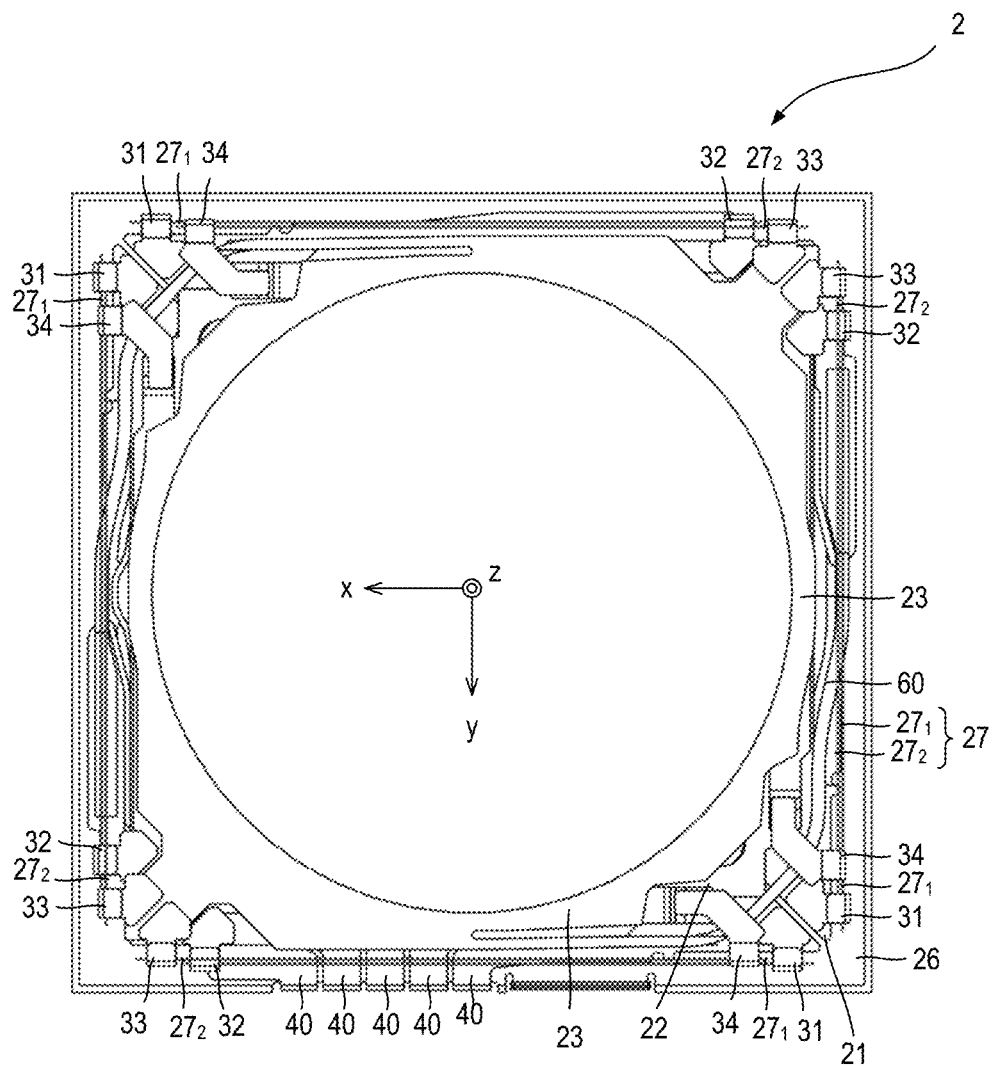
FIG. 2 is a top plan view of the SMA actuator assembly shown in FIG. 1.
Figure 3:
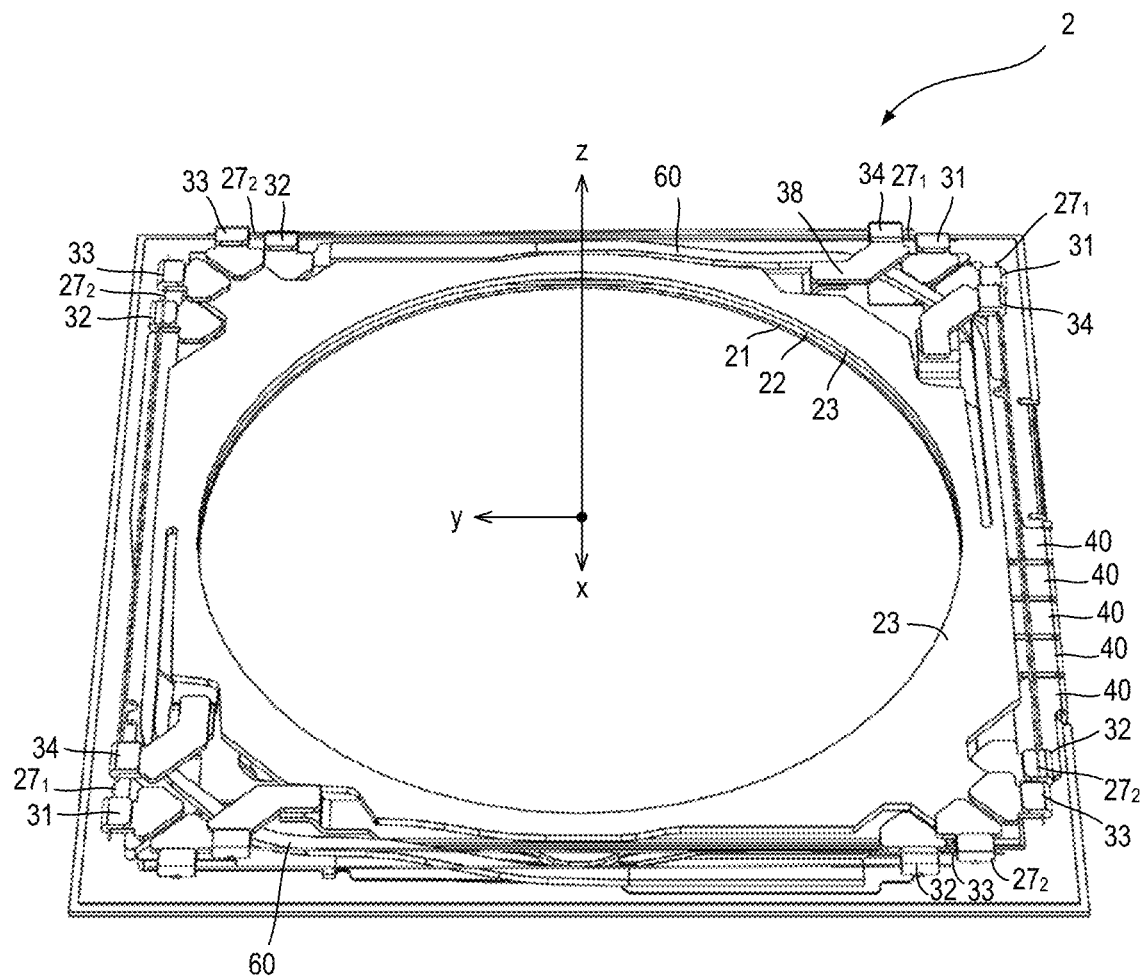
FIG. 3 is a top, angled view of the SMA actuator assembly shown in FIG. 1.
Figure 4:
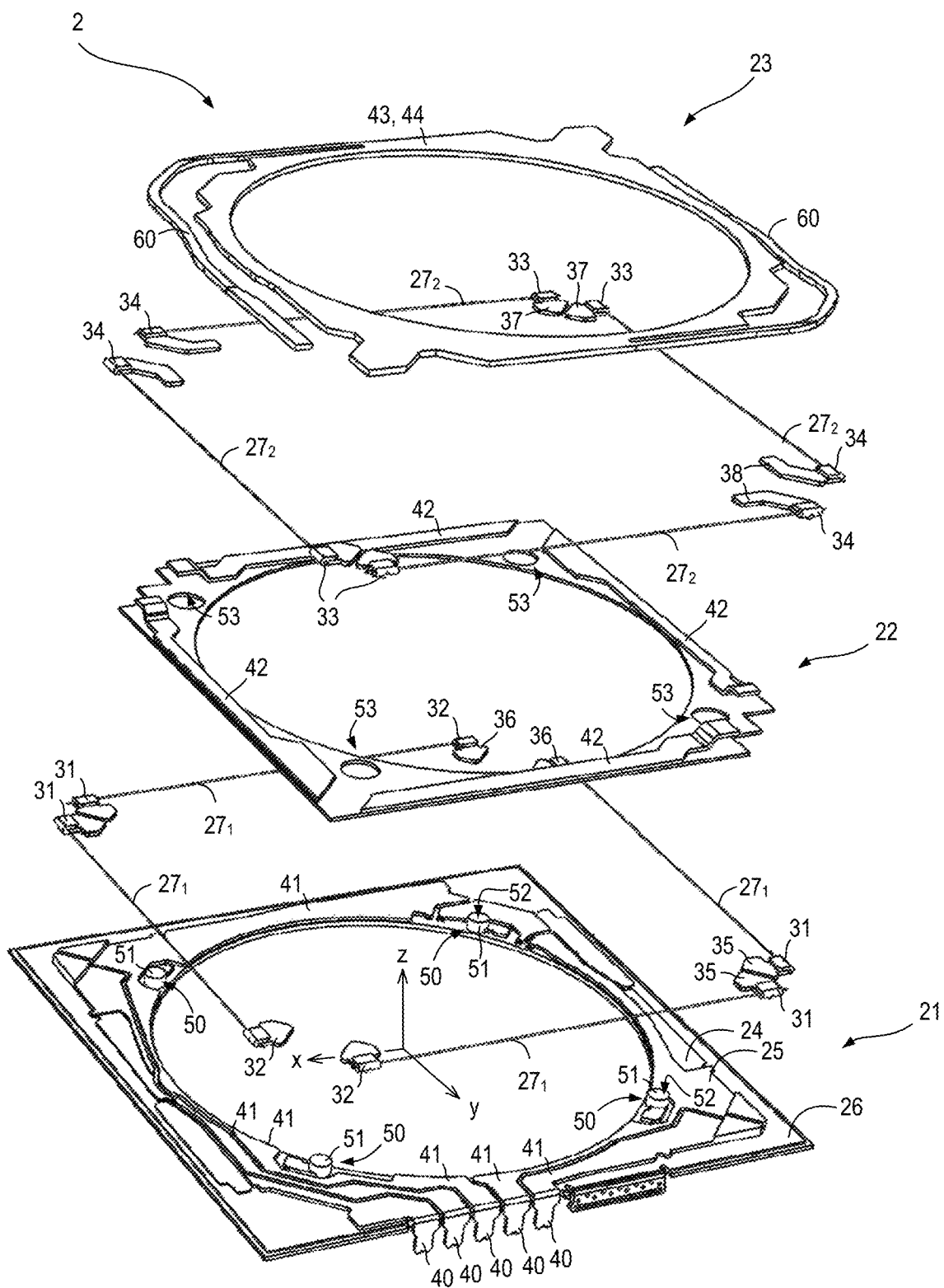
FIG. 4 is an exploded perspective view the SMA actuator assembly shown in FIG. 2 expanded along an optical axis O.

Referring now to FIGS. 2 to 4, the SMA actuator assembly 2 will now be described in more detail.

The SMA actuator assembly 2 takes the form of a n-stage SMA actuator assembly 2 (where in this case, n=2), which can provide extended lateral movement (or "longer stroke") perpendicular to the optical axis O than a single-stage SMA actuator assembly.

The actuator assembly 2 includes a first sub-assembly 21 (hereinafter referred to as a "support platform" or simply "support"), a second sub-assembly 22 (hereinafter referred to as an "intermediate platform", an "intermediate moving portion", an "intermediate stage" or, in this example, the "first stage") and a third sub-assembly 23 (hereinafter referred to as a "moving platform", a "moving portion", a "last stage" or, in this example, the "second stage") (see in particular FIG. 2). The moving platform 23 supports the lens assembly 3 (FIG. 1) and is connected to the lens carriage 10 (FIG. 1).

Each of the support platform 21, intermediate moving platform 22 and moving platform 23 generally take the form of a flat, thin annulus with a rectangular outer edge (or "peripheral edge") and a circular inner edge. The outer edges of the intermediate moving platform 22 and moving platform 23 lie inside the outer edge of the support platform 21, but the inner edges of the platforms 21, 22, 23 are generally co-extensive.

The first sub-assembly 21 is formed from two separate components, namely a support component 24 and a conductive component 25, which are affixed to each another.

The actuator assembly 2 may include a base component 26, which is affixed to the support platform 21, and to the base 5 (FIG. 1) of the camera 1 (FIG. 1).

The support component 24, conductive component 25 and base component 26 may take the form of respective patterned sheets of metal, e.g., etched or machined stainless steel, and may be coated with an electrically-insulating dielectric material. The dielectric material layer may include one or more windows (not shown) to allow electrical connection. Similarly, the intermediate moving platform 22 and the moving platform 23 may take the form of (one or more) respective patterned sheets of metal, such as stainless steel, which may be coated with dielectric material.

Other examples configurations may be used, and further details are provided in WO 2017/055788 A1 and WO 2019/086855 A1, which are incorporated herein by this reference.

The support platform 21, the intermediate moving platform 22, the moving platform 23 and the base component 26 are each provided with a respective central aperture aligned with the optical axis O allowing the passage of light from the lens assembly 3 (FIG. 1) to the image sensor 12 (FIG. 1).

Movement of the intermediate moving platform 22 and the moving platform 23 and, thus, the lens assembly 3 relative to the support platform 21, are driven by a lateral actuation arrangement comprising SMA wires 27, in this case, consisting of two sets of four SMA wires $27_1$, $27_2$.

The support platform 21 includes a first set of crimps 31 (hereinafter referred to as "static crimps"). The intermediate moving platform 22 includes with a second and third sets of crimps 32, 33 (hereinafter referred to as "moving intermediate crimps" and "static intermediate crimps" respectively). The moving platform 23 includes a fourth set of crimps 34 (hereinafter referred to as "moving crimps"). The first and second sets of crimps 31, 32 crimp the first set of four SMA wires $27_1$ so as to connect them to the support platform 21 and the intermediate moving platform 22. Similarly, the third and fourth sets of crimps 33, 34 crimp the second set of four SMA wires $27_2$ so as to connect them to the intermediate moving platform 22 and the moving platform 23. The SMA wires 27 may be perpendicular to the optical axis O or inclined at a small angle to the plane perpendicular to the optical axis O. Generally, in a set, the SMA wires 27 are non-collinear.

The crimps 31, 32, 33, 34 are provided with respective arm portions 35, 36, 37, 38 extending generally inwardly towards landing sites on the respective platforms 21, 22, 23 to which they suitably attached.

In operation, the SMA wires 27 are selectively driven to move the intermediate moving platform 22 and/or the moving platform 23 relative to the support platform 21 in any lateral direction (i.e., a direction perpendicular to the optical axis O).

Further details are also provided in WO 2013/175197 A1, which is incorporated herein by this reference.

Taking the example of the first set of four SMA wires $27_1$, the SMA wires $27_1$ have an arrangement in a loop at different angular positions around the optical axis O to provide two pairs of opposed SMA wires $27_1$ that are perpendicular to each other. Thus, each pair of opposed SMA wires $27_1$ is capable on selective driving of moving the lens assembly 3 in one of two perpendicular directions orthogonal to the optical axis O. Likewise, in the second set of four SMA wires $27_2$, each pair of opposed SMA wires $27_1$ is capable of selective driving to move the lens assembly 3 in one of two perpendicular directions orthogonal to the optical axis O. As a result, the SMA wires $27_1$, $27_2$ are capable of being selectively driven to move the lens assembly 3 relative to the support structure 4 to any position in a range of movement in two directions orthogonal to the optical axis O. The magnitude of the range of movement depends on the geometry and the range of contraction of the SMA wires $27_1$, $27_2$ within their normal operating parameters.

As will be explained in more detail hereinafter, movement of the two sets of SMA wires $27_1$, $27_2$ can be combined additively to move the moving platform 23 and, thus, lens assembly 3 (FIG. 1), further than using just one stage and one set of SMA wires The position of the lens assembly 3 (FIG. 1) relative to the support structure 4 (FIG. 1) perpendicular to the optical axis O is controlled by selectively varying the temperature of the SMA wires 27. This is achieved by passing through SMA wires 27 selective drive signals that provide resistive heating. Heating is provided directly by the drive current. Cooling is provided by reducing or ceasing the drive current to allow the SMA wire 27 to cool by conduction, convection and radiation to its surroundings.

On heating of one of the SMA wires 27, the stress in the SMA wire 27 increases and it contracts, causing movement of the lens assembly 3. A range of movement occurs as the temperature of the SMA increases over the range of temperature in which there occurs the transition of the SMA material from the Martensite phase to the Austenite phase. Conversely, on cooling of one of the SMA wires 27 so that the stress in the SMA wire 27 decreases, it expands under the force from opposing ones of the SMA wires 27. This allows the lens assembly 3 (FIG. 1) to move in the opposite direction.

The SMA wires 27 may be made of any suitable SMA material, for example Nitinol or another titanium-alloy SMA material.

The drive signals for the SMA wires 27 are generated and supplied by the control circuit implemented in the IC 7 (FIG. 1). The drive signals are generated by the control circuit in response to output signals of the gyroscope sensor 8 (FIG. 1) so as to drive movement of the lens assembly 3 to stabilise an image focused by the lens assembly 3 (FIG. 1) on the image sensor 12 (FIG. 1), thereby providing OIS. The drive signals may be generated using a resistance feedback control technique for example as described in WO 2014/076463 A1, which is incorporated herein by this reference.

Figure 5:
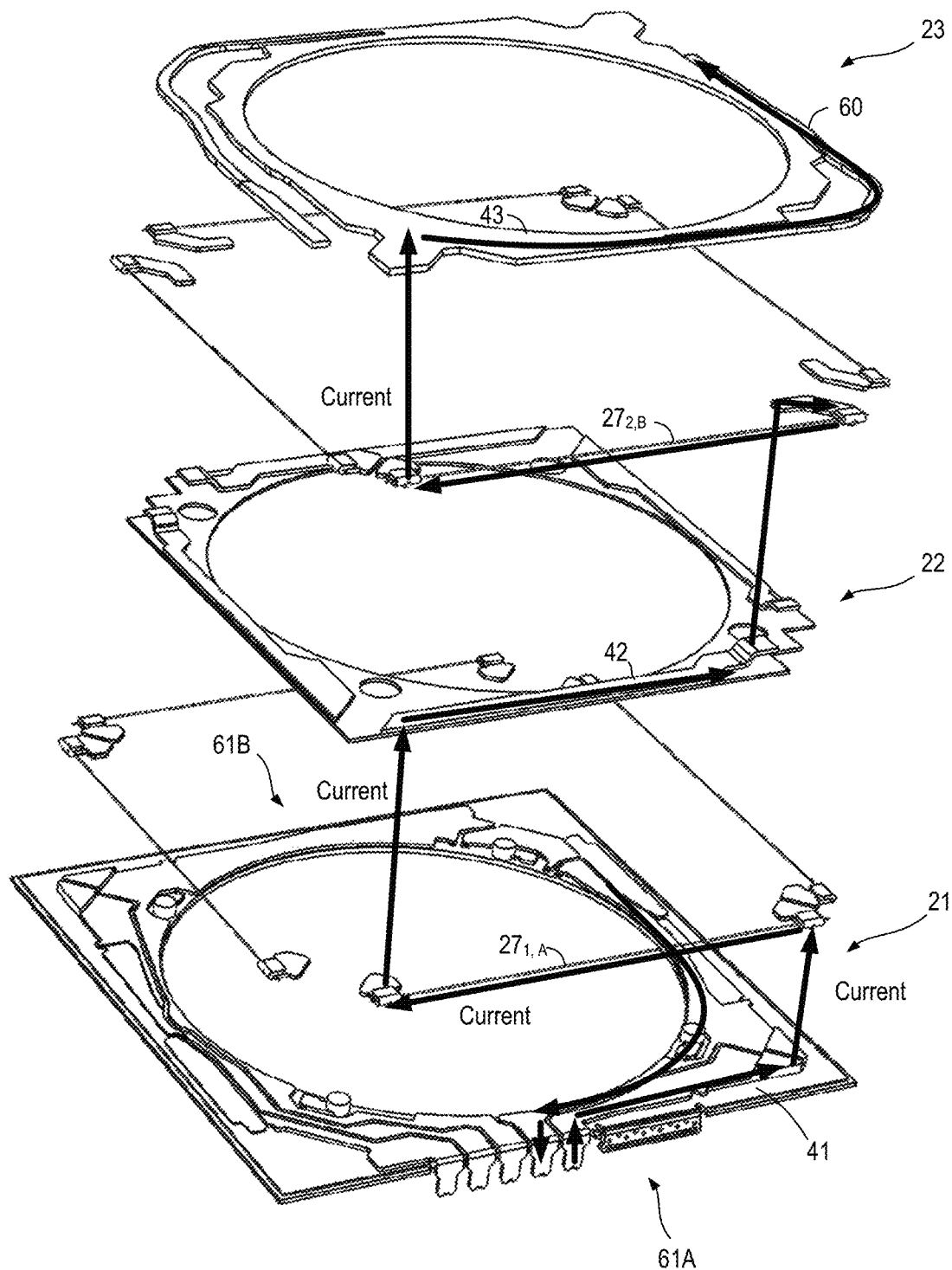
FIG. 5 is schematic circuit diagram of a first arrangement of SMA wires, which is used in the SMA actuator assembly shown in FIG. 2, and transistors used to control current flow through the SMA wires.

Referring also to FIG. 5, electrical connection to the SMA wires 27 is made by a set of terminals 40 via conductive tracks 41 on the support platform 21, conductive tracks 42 on the intermediate moving platform 22 and conductive tracks 43 on the moving platform 23. In some examples, the moving platform 23 is a single conductive piece which provides a common node 44. The conductive tracks 42 on the intermediate moving platform 22 may be formed by patterning a sheet of metal, for example stainless steel. The intermediate moving platform 22 may comprise an insulating support for the tracks 42, for example a sheet of metal coated in dielectric material.

Each wire in the first set of SMA wires $27_1$ is connected in series with a respective wire in the second set of SMA wires $27_2$ between a respective terminal 40 and a common node 44 (or "common connection") which provides a return path, via a flexible interconnect 45, to a common rail 46 (or "common connection"). Put differently, current through one SMA wire $27_1$ for moving the first stage 22 (i.e., the intermediate moving platform 22) passes though one SMA wire $27_2$ for moving the second stage 23 (i.e., the moving platform 23). Current through each pair of SMA wires $27_1$, $27_2$ is controlled by a field-effect transistor 47 or any suitable control circuitry.

As will be explained in more detail hereinafter, the SMA wires 27 may be connected in different ways resulting in different numbers of terminals.

Referring again to FIGS. 2 to 4, the actuator assembly 2 includes four plain bearings 50 spaced around the optical axis O to bear the moving platform 23 on the support platform 21. In general, a different number of bearings 50 may be used. Preferably, at least three bearings 50 are used in order to assist in providing stable support.

Each plain bearing 50 includes a bearing member 51 which in this case takes the form of cylinder. The bearing member 51 may be fixed to the support platform 21, for example by adhesive. In this case, a surface 52 ("upper surface") of the bearing member 51 on the opposite side from the support platform 21 and a surface (not shown) ("underside" or "downward-facing side") of the moving platform 23 are planar, conforming surfaces which contact one another.

Alternatively, the bearing member 51 may be fixed to the moving platform 23, for example by adhesive. In this case, a surface ("lower surface") (not shown) of the bearing member 51 on the opposite side from the moving platform 23 and a surface (not shown) ("topside" or "upward-facing side") of the support platform 21 are planar, conforming surfaces which contact one another. Each bearing member 51 passes through a (suitably-oversized) respective aperture 53 in the intermediate moving platform 22.

Thus, the contact between the conforming supports and bears the moving platform 23 directly on the support platform 21, allowing relative motion parallel to their extent, i.e., perpendicular to the optical axis O.

The bearing 50 may be made from a suitable metal or alloy such as phosphor bronze or stainless steel with a diamond-like carbon coating.

The actuator assembly 2 also includes two arms 60 connected between the support platform 21 and the moving platform 23. The arms 60 are resilient and are configured to provide a suitable retaining force along the optical axis O, and also to permit lateral movement with a suitable lateral biasing force. The arms 60 also provide electrical connections from the support structure 21 to the moving platform 23, as will be explained hereinafter.

In the assembled state of the actuator assembly 2, the arms 60 are deflected from their relaxed state in such a way that the arms 60 provide a force (i.e., the retaining force) which biases the platforms 21, 23 together and maintains the contact in the plain bearings 50. At the same time, the arms 60 can be laterally deflected to permit the movement of the moving platform 23 relative to the support platform 21 in directions perpendicular to the optical axis O.

The arms 60 provide a force (i.e., the lateral biasing force) that biases the moving platform 23 and hence the lens assembly 3 (FIG. 1) towards a central position from any direction around the central position, wherein the central position corresponds to the optical axis O of the lens assembly 3 being substantially aligned with the centre of the light-sensitive region of the image sensor 12 (FIG. 1). As a result, in the absence of driving of the lateral movement of the lens assembly 3 (FIG. 1), the lens assembly 3 (FIG. 1) will tend towards the central position from any direction around the central position. This ensures that the camera 1 remains functional to capture images, even in the absence of driving of the SMA wires 27. The magnitude of the lateral biasing force is kept low enough so as not to hinder OIS whilst preferably being high enough to centre the lens assembly 3 (FIG. 1) in the absence of driving.

Each arm 60 is generally 'L'-shaped and extends around the optical axis O. The angular extent of each arm 60 is preferably at least 90° as measured between the endpoints of the arm 60.

In this example, the arms 60 are formed integrally with the moving platform 23 at one end thereof and are connected to the support platform 21 at the other end thereof. Alternatively, the arms 60 may be formed integrally with the support platform 21 and connected to the moving platform 23 or the arms 60 may be separate parts connected to both platforms 21, 23. The arms 60 may be connected to the plate(s) 21, 23 by welding, which provides both mechanical and electrical connections.

The arms 60 are made of a suitable material that provides the desired mechanical properties and is electrically conductive. Typically, the material is a metal having a relatively high yield, for example steel such as stainless steel.

Wire Connections

Figure 6:
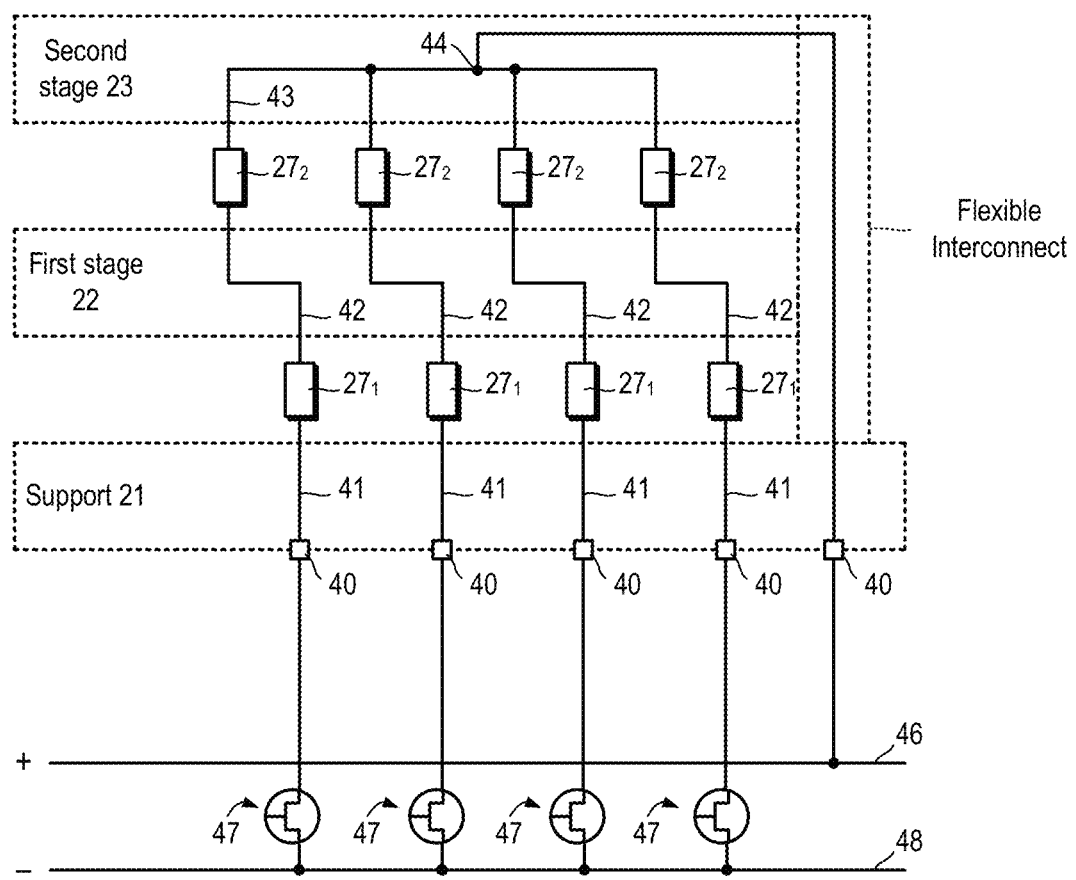
FIG. 6 is an exploded perspective view the SMA actuator assembly shown in FIG. 2 showing, for a first SMA wire in a first stage and a second, corresponding SMA wire in a second stage arranged in series, current flow through the wires.

Referring to FIGS. 5 and 6, the SMA actuator assembly 2 comprises two stages 22, 23 connected together mechanically in series and the SMA wires $27_1$, $27_2$ in the two stages 22, 23 are also connected electrically in series.

The support 21 provides four wire connections to the SMA wires 27, the intermediate moving portion 22 has no connections (only interconnections between the SMA wires $27_1$, $27_2$) and the moving portion 23 provides a common connection.

Referring in particular to FIG. 5, considering the SMA wire $27_{1,A}$ provided for the intermediate moving portion 22, i.e., the first stage 22, that moves the intermediate moving portion 22 in the +x direction, there are potentially two positions that the SMA wire $27_{2,B}$ could be provided for the moving portion 23, i.e., the second stage 23, that would move the moving portion 23 in the same direction. The SMA wire $27_{2,B}$ could be arranged on the same side 61A or on the opposite side 61B as the SMA wire $27_{1,A}$.

FIG. 5 shows current flow from a first terminal 40 on the support 21 via a track 41 in the support 21, via the first SMA wire $27_{1,A}$ to the intermediate moving portion 22, via a track 42 in the moving intermediate portion 23, via the second SMA wire $27_{2,B}$ to the moving portion 23 and then back to a second terminal on the support 21 via the moving portion 23, via the spring arm 60 and another track 41 in the support 21.

Using an arrangement in which the two wires $27_{1,A}$, $27_{2,B}$ are provided on the same side 61A can help in one or more ways, namely (i) it can simplify the connections required on the intermediate moving portion 22, e.g., the connections can be made by patterning a single layer of conductive material, (ii) the length of the tracks 42 on the intermediate moving portion 22 are shorter which can help to reduce interference on the image sensor (i.e., image noise) caused by the PWM signal used to drive the wires and (iii) both wires $27_{1,A}$, $27_{2,B}$ are in the same thermal environment and so are more likely to actuate in a similar manner.

Figure 8:
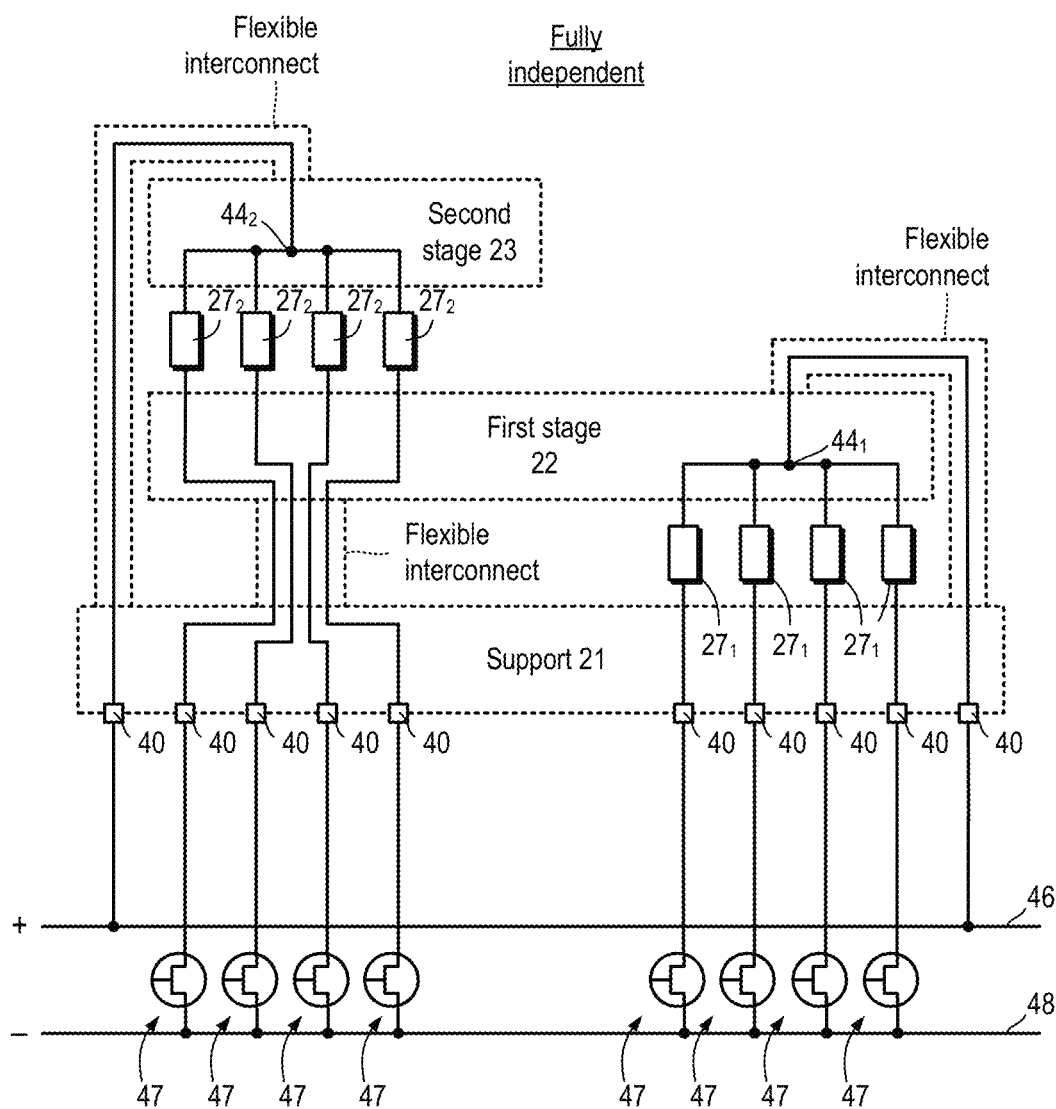
FIG. 8 is schematic circuit diagram of a third arrangement of SMA wires and transistors used to control current flow through the SMA wires.

Referring in particular to FIG. 8, in an alternative arrangement, each SMA wire $27_1$, $27_2$ is capable of being independently controlled by a respective FET 47.

One end of each SMA wire $27_1$ in the first set of SMA wires $27_1$ is connected to a respective terminal 40 on the support 21. The other ends of the SMA wires $27_1$ are connected to a common node $44_1$ (formed e.g. from a conductive layer) on the first stage 22 which is connected via a first flexible interconnect $70_1$ to a terminal 40 on the support 21.

Similarly, one end of each SMA wire $27_2$ in the second set of SMA wires $27_2$ is connected via a second flexible interconnect $70_2$ to terminals 40 on the support 21. The other end of the SMA wires $27_2$ are connected to a common node $44_2$ on the second stage 23 which is connected via a third flexible interconnect 703, to a terminal 40 on the support 21.

The flexible interconnects 70 may be formed in any suitable way. One or more of the flexible interconnects 70 may be formed on the arms 60 (FIG. 4) or other biasing springs (as described hereinafter). In such a case, the flexible interconnect 70 may be formed from the arm 60 itself or by forming one or more conductive tracks on the arm 60 (particularly where the flexible interconnect 70 involves multiple (e.g. four) connections). One or more of the flexible interconnects 70 may be formed in another way. For example, the flexible interconnect 70 may involve a flexible printed circuit as described, for example, in WO 2016/009200 A1 which is incorporated herein by this reference.

The arrangement of FIG. 8 involves ten terminals 40 and three flexible interconnects 70.

An alternative arrangement involves effectively inverting the electrical connections to the two stages 22, 23 with respect to each other. In this case, the common connection ("commons") for both stages are located on the intermediate moving portion 22. These could be connected together and treated as one connection, thus, reducing the number of connections.

Figure 9:
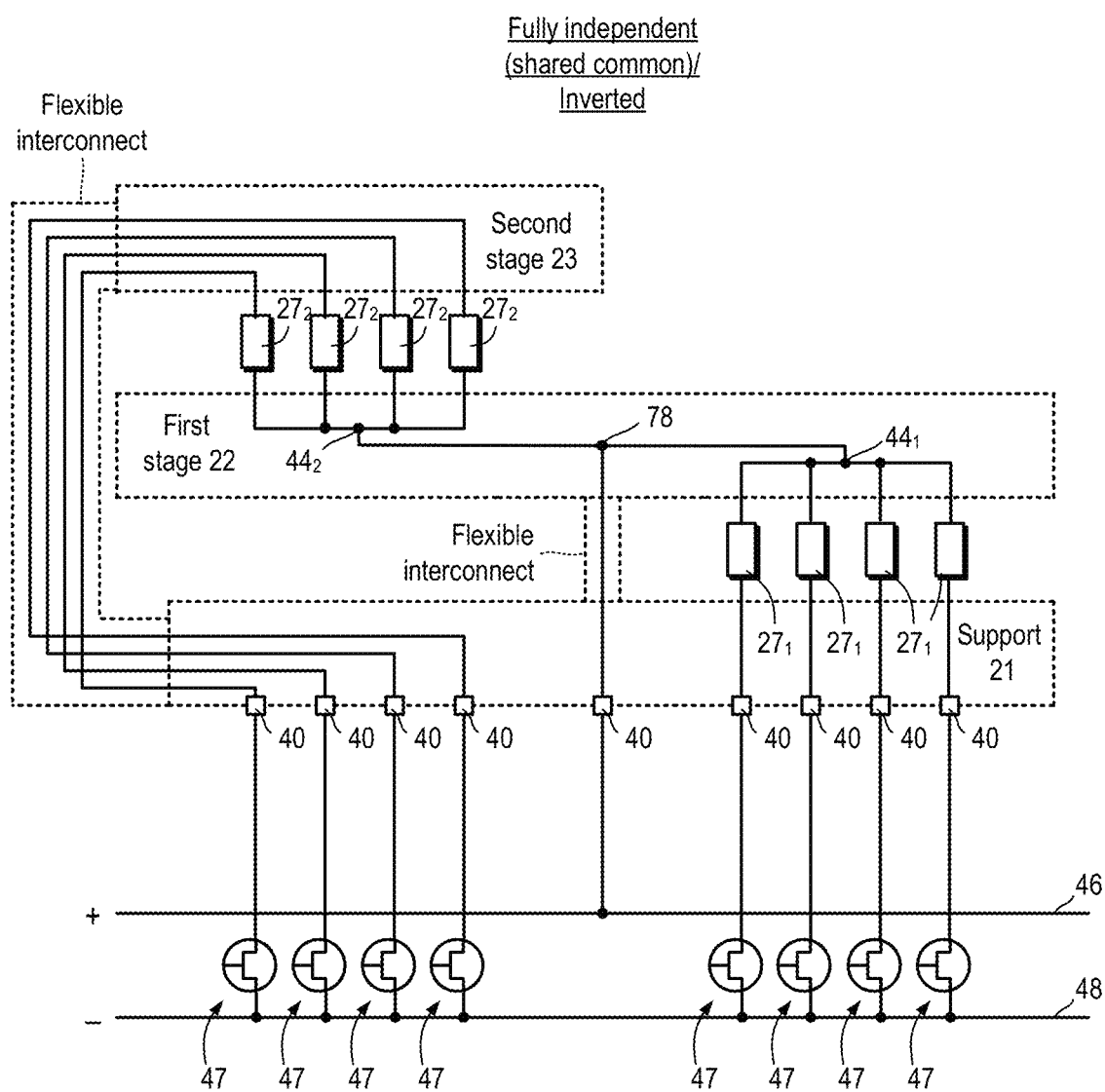
FIG. 9 is schematic circuit diagram of a fourth arrangement of SMA wires and transistors used to control current flow through the SMA wires.

Referring to FIG. 9, an example of such an arrangement will now be described.

In this case, the common nodes $44_1$, $44_2$ are connected to a node 78 on the first stage 22. The node 78 is connected, via a flexible interconnect $70_1$, to a terminal 40 on the support 21. Hence the arrangement of FIG. 9 involves one fewer terminal 40 and one fewer flexible interconnect 70 than that of FIG. 8.

In this case, each SMA wire $27_1$, $27_2$ is capable of being independently controlled by a respective FET 47.

Figure 7:
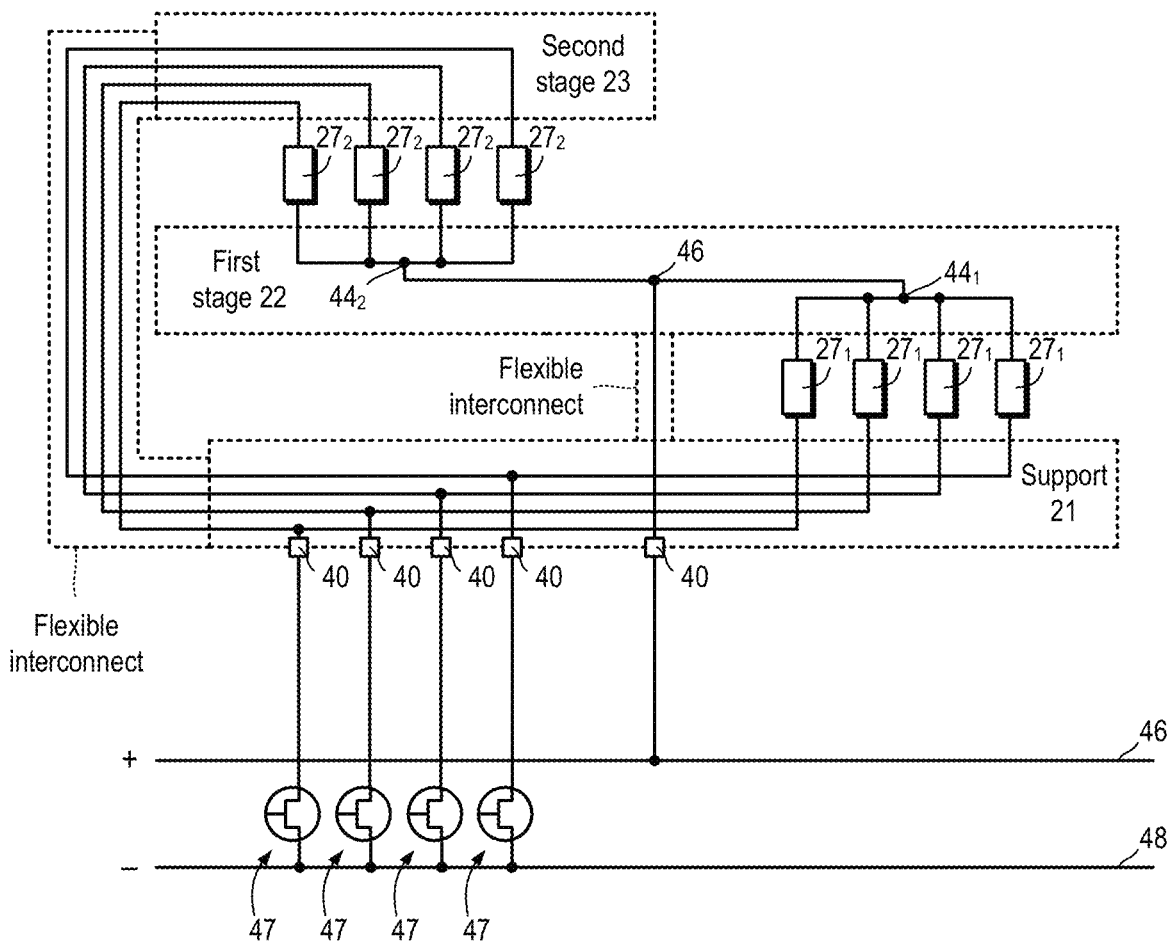
FIG. 7 is schematic circuit diagram of a second arrangement of SMA wires and transistors used to control current flow through the SMA wires.

Referring to FIG. 7, an alternative electrical arrangement is shown in which SMA wires $27_1$, $27_2$ in the two stages 22, 23 are connected electrically in parallel. A suitable arrangement of tracks on the support 41 and stages 22, 23 is used. Hence the arrangement of FIG. 7 involves four fewer terminal 40 and can be controlled by four fewer FETs 47.

Manufacturing

Referring again to FIGS. 2 to 4, if an SMA wire $27_2$ in the second stage 23 is directly above an SMA wire $27_1$ in the first stage 22, then it may be difficult to insert a crimping tool (not shown) into the correct positions to allow the SMA wires $27_1$, $27_2$ to be crimped and thereby attached to the rest of the actuator 2.

Figure 10:
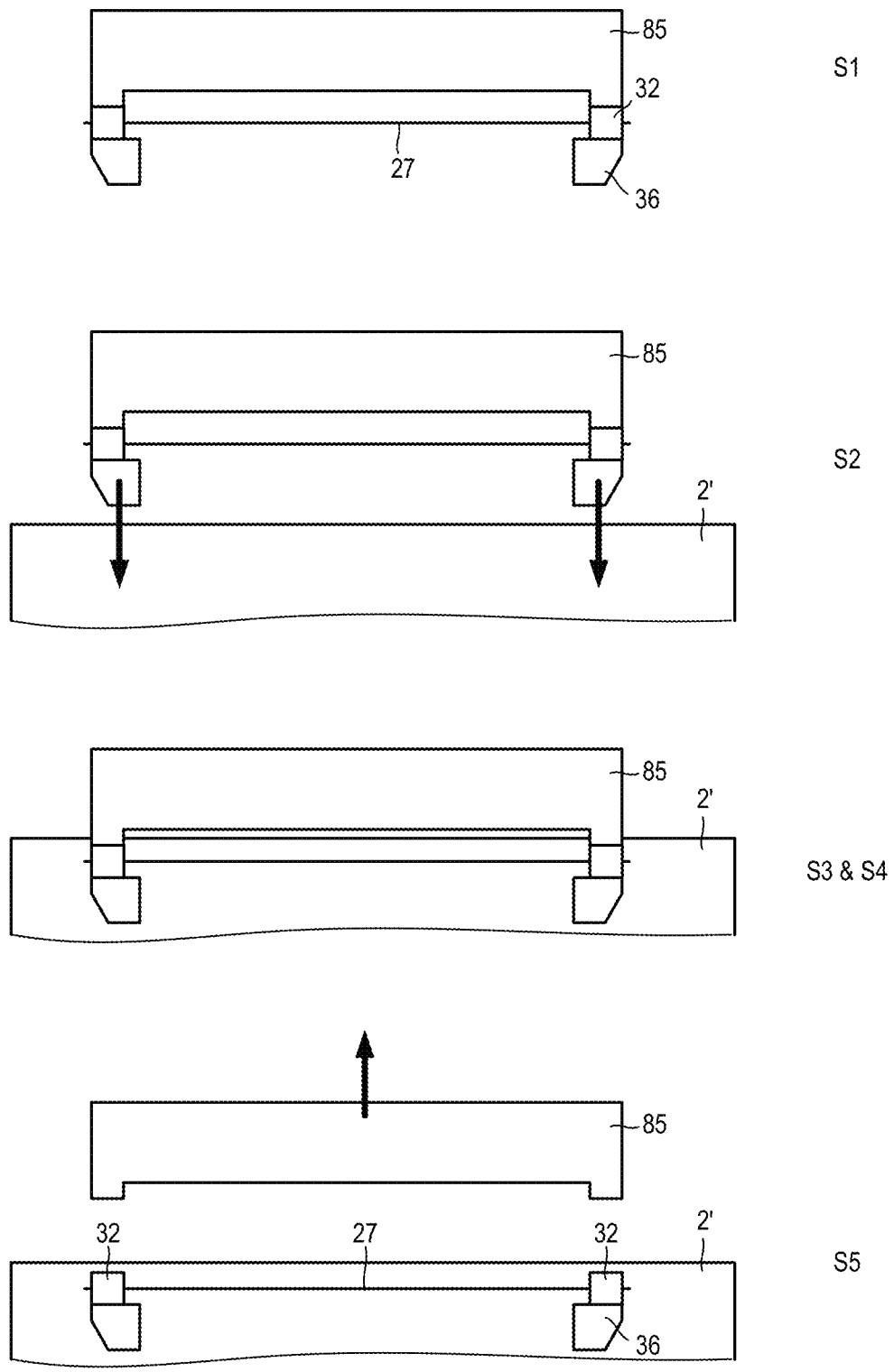
FIG. 10 schematically illustrates a process of attaching a pre-crimped SMA wire to an actuator assembly.

Referring to FIG. 10, to address this, the SMA wires 27 may be crimped onto a strut element 85 (or "fret") remotely from the actuator-under-assembly (step S1). The fret 85 having respective crimps 32 at their distal ends with an SMA wire 27 running between the crimps 27 is offered up to the actuator-under-assembly 2' (step S2) and attached to the actuator-under-assembly 2' e.g. by welding (step S3). The frets 85 are detached from the crimps 35 using a cropping tool or a laser (not shown) (step S4) and the fret 85 is withdrawn (step S5).

Further details can be found in WO 2016/189314 A1 which is incorporated herein by this reference.

Thus, the actuator 2 is fabricated by first assembling the support 21, intermediate moving portion 22 and moving portion 23, together with the bearings 50, and held together with the spring arms 60. Next, the first set of wires $27_1$ and corresponding crimps 31, 32 are attached to the support 21 and intermediate moving portion 22, and the second set of wires $27_2$ and corresponding crimps 33, 34 are attached to the intermediate moving portion 22 and moving portion 23.

Bearing Arrangement & Loading of Bearings

In one arrangement, there is a first set of bearings between the intermediate moving component and the static component and a second set of bearings between the moving component and the intermediate moving component. In addition, there is a set of biasing springs (or other biasing arrangement such as magnets) between the intermediate moving component and the static component, and second set of bias springs (or other biasing arrangement) between the moving component and the intermediate moving component, where the bias springs load the respective bearings.

However, the number of sets of bearings and/or bias springs may be reduced in several ways. For example, there may be a single set of biasing springs which span from the moving portion to the support and loads all of the bearings. Alternatively or additionally, the moving portion may directly bear on the support.

Referring to FIGS. 2 to 4, the actuator assembly 2 has a single set of biasing springs 60 which span from the moving portion 23 to the support 21, and the moving portion 23 directly bears on the support 21.

In this case, the intermediate moving portion 22 can be constrained, for example, with small clearances between the support 21 and the moving portion 23, or there could be a weak spring force applied to the intermediate moving portion 22 to press it against a secondary bearing surface on either the moving portion 23 or the support 21.

The intermediate moving portion 22 may tilt during operation, in other words, when the intermediate moving portion 22 is moved by the SMA wires $27_1$, $27_2$.

Although not shown in the drawings, the moving portion 23 may be provided with end stops (herein also referred to as "second stage end stops") to provide limits on lateral movement of the moving portion 23. Furthermore, the intermediate portion may also be provided with its own end stops (herein also referred to as "first stage end stops"). In this way, the first and second sets of SMA wires $27_1$, $27_2$ can be independently protected.

The first and second stage end stops can both be formed from features having a fixed position relative to the support 21. For example, they may involve features of the can 9 (FIG. 1) or the support 21 (e.g. upstanding members). The first or the second stage end stops can be formed between the intermediate portion 22 and the moving portion 23. For example, there may be depending members from the moving portion 23 that can engage with corresponding upstanding members from the intermediate portion 22 so as to provide limits on the relative lateral movement of the intermediate portion 22 and the moving portion 23 (the movement of one, or possibly both, of which relative to the support 21 is limited).

As explained hereinbefore, the bearing 50 between the moving portion 23 and the support pass through or sits in holes 53 in the intermediate moving portion 22. Although plain bearings are described, ball bearings or other form of bearings can be used.

Drive

Referring again to FIGS. 8 and 9, in the case where all eight SMA wires $27_1$, $27_2$ can be heated independently, stacked and overlapping PWM waveforms may be used to allow sufficient power to be delivered.

Both sets of SMA wire $27_1$, $27_2$ can be driven to the same amplitude.

Alternatively, to save power and/or when only short small movements are needed (for example, the camera is taking still images and not video), only one set of SMA wires $27_1$, $27_2$ may be driven, leaving the other set of SMA wires $27_1$, $27_2$ unpowered or in a low-power, zero-displacement state.

Referring again to FIG. 5, in the case where pairs of SMA wires $27_1$, $27_2$ are connected in series, the resistance of a pair of SMA wires $27_1$, $27_2$ can be high, which can make it difficult to deliver enough power to the actuator 2. One or more approaches can be used to help enable sufficient power to be delivered.

First, the drive voltage may be increased, for example, from 2.8V to 3V or even to 5V. Secondly, all four wire pairs may be driven at the same time. Thirdly, the SMA wire diameter may be increased from, for example, 25 µm to 30 µm or even to 35 µm.

Vertical or Horizontal Stacking

In the embodiments hereinbefore described, stages are stacked vertically, i.e. one on top of each other (stacked in along the z-axis direction). However, in alternative arrangement, two or more of the stages may be nested. For example, the stages may all be nested with the support on the outside, the intermediate moving portion generally inside the support and the moving portion generally inside the intermediate moving portion.

Additive Movement

Figure 11:
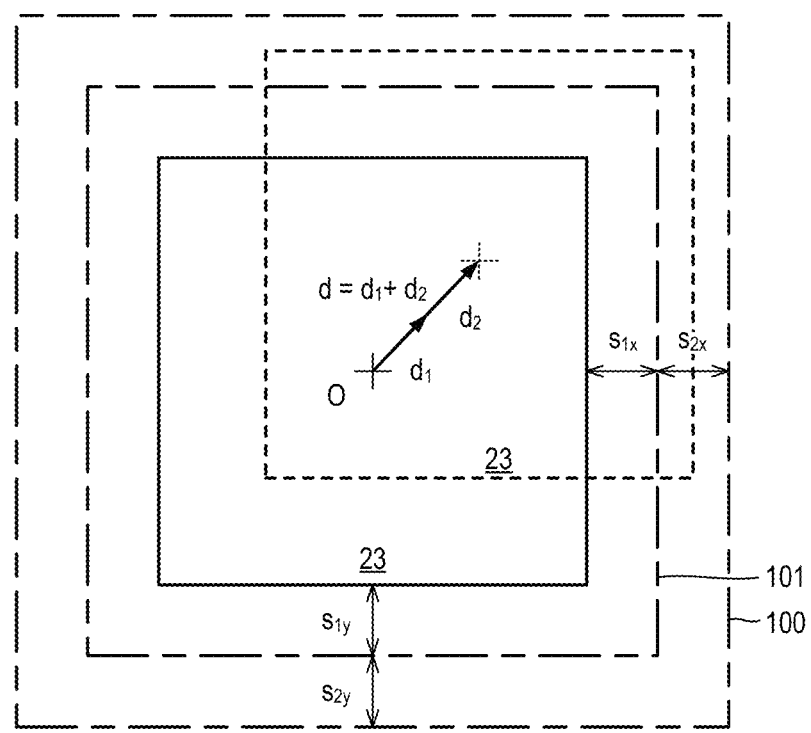
FIG. 11 is a simple schematic plan view of a moving platform of the SMA actuator assembly shown in FIG. 2 illustrating additive movement from two stage.

Referring to FIG. 11, the two-stage SMA actuator assembly 2 is afforded extended lateral movement (or "longer stroke") in the x-y plane (i.e., perpendicular to the optical axis O).

The moving platform 23 is shown centred on the optical axis O.

The first stage has a stroke $S_{1x}$, $S_{1y}$ and the second stage has a stroke $S_{2x}$, $S_{2y}$. The moving platform 23 is capable of being moved laterally (i.e., in the x-y plane) to any position within and extended boundary 100, which is greater than the boundary 101 which is provided by just one of the stages.

Other Variations

It will be appreciated that there may be many other variations of the above-described embodiments.

For example, there may be more than two stages, e.g. three stages including first and second intermediate moving stages and a moving stage.

The moving platforms need not move only in the x-y plane.

The actuator assembly need not be configured to support a lens assembly and, for example, may be configured to support another type of optical element, an image sensor, etc. The platforms need not include apertures.

The actuator assembly need not be used in a camera.

The z-axis need not correspond to an optical axis. The z-axis may correspond to a line that is perpendicular to a plane defined by planar surfaces of the moving and/or support platform. The z-axis may correspond to a line that is perpendicular to a plane defined by the directions of movement of the moving platform.

The actuator assembly may be any type of assembly that comprises a first part and a second part movable with respect to the first part. The actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device, a mobile or portable computing device, a mobile or portable electronic device, a laptop, a tablet computing device, an e-reader, a computing accessory or computing peripheral device, an audio device, a security system, a gaming system, a gaming accessory, a robot or robotics device, a medical device, an augmented reality system, an augmented reality device, a virtual reality system, a virtual reality device, a wearable device, a drone, an aircraft, a spacecraft, a submersible vessel, a vehicle, and an autonomous vehicle, a tool, a surgical tool, a remote controller, clothing, a switch, dial or button, a display screen, a touchscreen, a flexible surface, and a wireless communication device. It will be understood that this is a non-exhaustive list of example devices.

The invention claimed is:

1. A shape memory alloy actuator assembly comprising:
a support;
a first stage moveable in at least two different non-parallel directions in a first plane relative to the support;
a first set of at least two shape memory alloy wires configured to move the first stage in the first plane;
a second stage moveable in at least two different non-parallel directions in a second plane parallel to or coplanar with the first plane relative to the first stage; and
a second set of at least two shape memory alloy wires configured to move the second stage in the second plane;
wherein the first stage is coupled to the support via the first set of memory alloy wires and the second stage is coupled to the first stage via the second set of shape memory alloy wires such that movement of the second stage in the second plane with respect to the support is a combination of movement of the first stage relative to support and the second stage relative to the first stage.

2. The shape memory alloy actuator assembly of claim 1 wherein:
the first set of at least two shape memory alloy wires comprises four shape memory alloy wires comprising a first pair of wires acting in opposition for moving the first stage in a first direction, and a second pair of wires acting in opposition for moving the first stage in a second direction different from the first direction, and
the second set of at least two shape memory alloy wires comprises four shape memory alloy wires comprising a third pair of wires acting in opposition for moving the second stage in the first direction or in a third direction, and a fourth pair of wires acting in opposition for moving the second stage in the second direction or in a fourth direction different from the third direction.

3. The shape memory alloy actuator assembly of claim 1, further comprising:
first and second terminals;
wherein a first shape memory alloy wire in the first set of shape memory alloy wires and a second shape memory alloy wire in the second set of shape memory alloy wires are electrically connected in series or in parallel between the first and second terminals,
and wherein the first and second shape memory alloy wires act in concert to move the first and second stages, respectively.

4. The shape memory alloy actuator assembly of claim 3, wherein the first and second shape memory alloy wires are interconnected in the first stage, wherein the first stage comprises a conducting layer supported by an insulating layer, wherein at least a portion of the conducting layer interconnects the first and second shape memory alloy wires.

5. The shape memory alloy actuator assembly of claim 1, further comprising:
a common node and a flexible electrical connection between the support and the common node;
wherein at least a first shape memory alloy wire in the first set of shape memory alloy wires and at least a second shape memory alloy wire in the second set of shape memory alloy wires are connected to the common node;
wherein the common node is comprised in the first stage.

6. The shape memory alloy actuator assembly of claim 5, comprising:
a flexible electrical connection between the support and the second stage to electrically connect to the at least one second shape memory alloy wire.

7. The shape memory alloy actuator assembly of claim 1, further comprising:
a common node and a flexible electrical connection between the support and the common node;
wherein at least one pair of shape memory alloy wires consisting of one of the first set of shape memory alloy wires and one of the second set of shape memory alloy wires is electrically connected in series to the common node;
wherein the common node is comprised in the second stage.

8. The shape memory alloy actuator assembly of claim 1, further comprising:
five terminals including first through to fifth terminals, the fifth terminal being a common terminal;

wherein the first and second sets of shape memory alloy wires are connected to the terminals such that, in response to respective signals being applied to the first through fourth terminals with respect to the common terminal, the first and second sets of sets of shape memory alloy wires cause the first and second stages to move in concert.

9. The shape memory alloy actuator assembly of claim 1, further comprising:
a bearing system configured to enable the movement of the second stage in the at least two different non-parallel in the second plane, wherein the second stage directly bears on the support via the bearing system.

10. The shape memory alloy actuator assembly of claim 9, further comprising:
an arrangement for loading the bearing system by urging the support and second stage together with the first stage interposed between the support and second stage.

11. The shape memory alloy actuator assembly of claim 10, wherein the loading arrangement comprises:
a set of at least two biasing springs, wherein at least one of the springs carries an electrical connection between the support and the second stage.

12. The shape memory alloy actuator assembly of claim 10, wherein the loading arrangement comprises at least one permanent magnet.

13. The shape memory alloy actuator assembly of claim 1, wherein the first set of shape memory alloy wires and/or the second set of shape memory alloy wires are inclined with respect to the first plane so as encourage urging of the support and second stage together.

14. The shape memory alloy actuator assembly of any one of claim 1, further comprising:
a third stage moveable in at least two different non-parallel directions in a third plane parallel to or coplanar with the first plane relative to the second stage; and
a third set of at least two shape memory alloy wires configured to move the third stage; wherein in third stage is interposed between the first stage and the second stage, such that the first stage and the second stage are coupled via the third stage.

15. The shape memory alloy actuator assembly of claim 1, further comprising:
an additional stage moveable perpendicularly to the first plane;
wherein the additional stage is supported by the second stage.

16. The shape memory alloy actuator assembly of claim 1, wherein the support, first stage and the second stage are stacked in a direction normal to the first plane.

17. The shape memory alloy actuator assembly of claim 1, wherein at least two of the support, the first stage and the second stage are generally co-planar and nested.

18. A system comprising:
the shape memory alloy actuator assembly of claim 1;
a supply rail for delivering a drive voltage;
a set of switching devices for applying drive signals at the drive voltage to respective shape memory alloy wires or respective pairs of shape memory alloy wires; and
a controller for individually controlling the switching devices.

19. An optical device comprising:
a body;
a first optical element;
a second optical element; and
the shape memory alloy actuator assembly of claim 1;
wherein the first optical element and second optical element are generally aligned along an optical axis, and
wherein the first optical element and the support of the actuator element are fixed with respect to the body and the second optical element is supported by second stage of the optical element.

20. A shape memory alloy actuator assembly comprising:
a first sub-assembly;
a second sub-assembly moveable in at least two different non-parallel directions in a first plane relative to the first sub-assembly;
a first set of at least two shape memory alloy wires configured to move the second sub-assembly in the first plane;
a third sub-assembly moveable in at least two different non-parallel directions in a second plane parallel to or coplanar with the first plane relative to the second sub-assembly; and
a second set of at least two shape memory alloy wires configured to move the third sub-assembly in the second plane;
wherein the second sub-assembly is coupled to the first sub-assembly via the first set of memory alloy wires and the third sub-assembly is coupled to the second sub-assembly via the second set of shape memory alloy wires such that movement of the third sub-assembly in the second plane with respect to the first sub-assembly is a combination of movement of the second sub-assembly relative to first sub-assembly and the third sub-assembly relative to the second sub-assembly.

* * * * *